United States Patent Office 3,239,558
Patented Mar. 8, 1966

3,239,558
1,3-BIS-(o-CHLOROBENZYLAMINOMETHYL)-
CAMPHOCEAN AND SALT THEREOF
Leslie G. Humber, Montreal, Quebec, Canada, assignor to American Home Products Corporation, New York, N.Y., a corporation of Delaware
No Drawing. Filed Nov. 4, 1963, Ser. No. 321,290
3 Claims. (Cl. 260—570.5)

This invention relates to novel chemical compounds, new derivatives of camphocean, and to a process for their preparation. More particularly, my invention relates to new aryl derivatives of 1,3-bis(aminomethyl)-camphocean which possess valuable pharmacological properties. The new chemical compounds of this invention are also valuable in combination with suitable carriers, as a preferred form of administration as a therapeutic agent for animals.

This invention also relates to new intermediates in the preparation of said pharmacologically active compounds.

The new pharmacologically active compounds, in base form, may be generically represented by the formula:

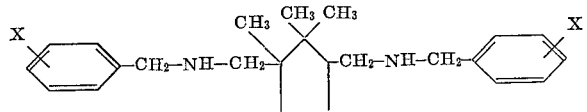

wherein X is a halogen, preferably in position ortho.

These compounds, being basic in nature, form tertiary acid addition salts. Such acid addition salts with pharmacologically acceptable acids are biologically equivalent to the corresponding free bases, and constitute a preferred form for the administration of the compounds of my invention.

The new chemical compounds, both as the free base and in the form of salts with pharmacologically acceptable acids, are useful for lowering cholestrol levels in the blood. For example, they will lower cholestrol blood levels in the intact rat by highly significant degrees when administered orally in small doses. They are also effective in inhibiting cholestrol biosynthesis in vitro.

As agents for lowering cholestrol levels in blood, the active compounds of this invention may be administered both orally or by injection. For oral administration, the active compounds of this invention, either as the free base or in the form of a pharmacologically acceptable salt, may be formulated in solid dosage forms such as tablets or capsules, together with carriers such as, e.g., lactose, starch, magnesium stearate, and the like. For administration by injection the active compounds of this invention are preferably used in the form of one of their pharmacologically acceptable salts, dissolved in a suitable aqueous vehicle. Both oral dosage forms and dosage forms for injection may be formulated to contain from 5 to 500 mg. of the active ingredient.

My preferred procedure for preparing the new chemical compounds may be described as follows:

1,3-bis-(aminomethyl)-camphocean, the preparation of which has been described by J. Bredt et al. in J. Praktische Chemie, vol. 133, p. 84 (1932), is caused to react with a halogenically-substituted benzaldehyde by bringing the two reactants together, at a suitable temperature, preferably and, if necessary, in the presence of an inert solvent. A preferred solvent in this reaction is benzene. A preferred temperature is the temperature of reflux of the reaction mixture. This results in condensation to form the corrresponding Schiff base, with elimination of two molecules of water which are conveniently removed, preferably by azeotropic distillation.

The resulting Schiff base is then reduced to the corresponding amino compound. Convenient reducing agents include lithium aluminium hydride in an inert solvent such as ethers or cyclic ethers, sodium borohydride in alcoholic solution and catalytic hydrogenation. This reduction is preferably carried out with sodium borohydride in methanolic solution. The free base is then recovered, preferably by evaporation of the solvent, distribution between water and a water-immiscible organic solvent, preferably diethyl ether, and evaporation of the latter solvent, yielding the free base as an oily product.

If a pharmacologically equivalent acid addition salt of the base is desired, this may be prepared by treating the base in the conventional manner with the acid. The acid selected will, of course, be a pharmaceutically acceptable acid, for example a mineral acid such as one of the hydrohalic acids, or an organic acid such as, for example, maleic acid.

A preferred embodiment of this process may be indicated schematically as follows, as applied, by way of example, to a preferred embodiment for the production of 1,3-bis-(o-chlorobenzylaminomethyl)-camphocean:

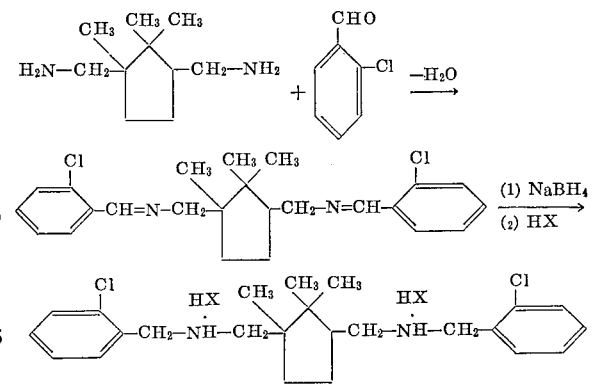

where HX is a pharmaceutically acceptable acid.

When utilized as agent for lowering cholestrol levels in blood, the compound 1,3-bis-(o-chlorobenzylaminomethyl)-camphocean, when administered orally to rats in dose level of 10 micromoles per kilogram body weight, has been observed to reduce the serum cholestrol level by 67 percent. In vitro, cholestrol biosynthesis in a rat liver homogenate is reduced by 87 percent by a molar concentration of $1 \times 10^{-6}$ of the same compound.

The following example is illustrative of my invention:

*Example 1.—1,3-bis-(o-chlorobenzylaminomethyl)-camphocean*

1,3-bis-(aminomethyl)-camphocean (5.0 gm., 0.029 mole) and o-chlorobenzaldehyde (8.43 gm., 0.06 mole) were combined in benzene (100 ml.) and heated to reflux for twelve hours. On removal of the benzene and the liberated water by distillation, there remained the Schiff base a semi-solid (13.4 gm.). It had a strong band in the infrared at 1636 cm.$^{-1}$.

The Schiff base was dissolved in methanol (100 ml.) and sodium borohydride (3.5 gm., 0.099 mole) was added portionwise. The mixture was refluxed for 24 hours, the methanol removed by distillation and the residue distributed between ether and water. The ether layer was dried ($Na_2SO_4$) and evaporated to yield the title compound as an oil with bands in the infrared at 1445 cm.$^{-1}$ and 2910 cm.$^{-1}$.

The dihydrochloride salt was prepared with ethereal hydrogen chloride. It was crystallized from a methanol-ether mixture and had M.P. 309–310° C.

Analysis confirmed the empirical formula $C_{24}H_{34}N_2Cl_2$.

I claim:
1. A compound selected from the group which con- sists of 1,3-bis-(o-chlorobenzylaminomethyl)-camphocean and its dihydrochloride salt.

2. 1,3-bis-(o-chlorobenzylaminomethyl)-camphocean.

3. The dihydrochloride salt of 1,3-bis-(o-chlorobenzylaminomethyl)-camphocean.

References Cited by the Examiner

UNITED STATES PATENTS 3,013,020  12/1961  Fancher _____ 260—570.5 XR

OTHER REFERENCES

British Medical Journal, page 258 (1964).

Lederle Research Report, Jour. Amer. Med. Association, vol. 189, No. 12, pages 8688-4-P4 and 8688-4-P5 (1964).

CHARLES B. PARKER, *Primary Examiner.*